US012249295B2

(12) United States Patent
Ichikura

(10) Patent No.: US 12,249,295 B2
(45) Date of Patent: Mar. 11, 2025

(54) SEMICONDUCTOR DEVICE, DISPLAY DRIVER, AND DISPLAY DEVICE

(71) Applicant: LAPIS Technology Co., Ltd., Yokohama (JP)

(72) Inventor: Hiroyoshi Ichikura, Yokohama (JP)

(73) Assignee: LAPIS Technology Co., Ltd., Yokohama (JP)

( * ) Notice: Subject to any disclaimer, the term of this patent is extended or adjusted under 35 U.S.C. 154(b) by 0 days.

(21) Appl. No.: 18/633,464

(22) Filed: Apr. 11, 2024

(65) Prior Publication Data

US 2024/0347019 A1 Oct. 17, 2024

(30) Foreign Application Priority Data

Apr. 17, 2023 (JP) ................................ 2023-066905

(51) Int. Cl.
*G09G 3/36* (2006.01)

(52) U.S. Cl.
CPC ......... *G09G 3/3696* (2013.01); *G09G 3/3688* (2013.01); *G09G 2310/0291* (2013.01); *G09G 2310/08* (2013.01); *G09G 2320/0242* (2013.01)

(58) Field of Classification Search
CPC ........... G09G 3/3688; G09G 2310/027; G09G 2320/0223
See application file for complete search history.

(56) References Cited

U.S. PATENT DOCUMENTS

2007/0024553 A1* 2/2007 Araki .................. G09G 3/3648 345/87
2008/0309607 A1* 12/2008 Arai ..................... G09G 3/3688 345/99
2015/0097871 A1* 4/2015 Kumeta ............... G09G 3/3225 345/690
2021/0183328 A1* 6/2021 Taniguchi ............ G09G 3/3266

FOREIGN PATENT DOCUMENTS

JP 2014142487 8/2014

* cited by examiner

*Primary Examiner* — Van N Chow
(74) *Attorney, Agent, or Firm* — JCIPRNET

(57) ABSTRACT

A semiconductor device includes a gradation voltage generation circuit, output amplifier circuits, a drive control circuit, and a delay time measurement circuit. The gradation voltage generation circuit converts, according to a load signal, pixel data pieces into gradation voltages and outputs the gradation voltages. The output amplifier circuits generate drive signals by individually amplifying the gradation voltages, and output the drive signals to data lines. The drive control circuit outputs the load signal to the gradation voltage generation circuit according to a horizontal synchronization signal. The delay time measurement circuit obtains, as a measured delay time, a time from receiving the measurement start signal until a voltage value of the drive signal outputted from one of the output amplifier circuits exceeds a predetermined threshold voltage. The drive control circuit shifts a timing of outputting the load signal by a difference between the measured delay time and a reference delay time.

12 Claims, 11 Drawing Sheets

SEMICONDUCTOR DEVICE, DISPLAY DRIVER, AND DISPLAY DEVICE

CROSS-REFERENCE TO RELATED APPLICATION

This application claims the priority benefit of Japan application serial no. 2023-066905, filed on Apr. 17, 2023. The entirety of the above-mentioned patent application is hereby incorporated by reference herein and made a part of this specification.

BACKGROUND

Technical Field

The disclosure relates to a semiconductor device that drives a display panel according to a video signal, and a display driver and a display device including the semiconductor device.

Related Art

A liquid crystal display device is mounted with a display panel on which a plurality of data lines and a plurality of scan lines are wired in a crossing pattern, and a source driver that supplies a drive signal having a voltage value corresponding to a luminance level of each pixel based on a video signal to each data line of the display panel.

In recent years, with the increase in size and definition enhancement of display panels, liquid crystal display devices constructed by dividing the source driver into a plurality of IC chips have been commercialized.

However, due to manufacturing variations and the like, errors may occur in the frequency of clock signals generated by oscillators formed in each of the plurality of source driver ICs. Accordingly, the timing of supplying the drive signal to the display panel may deviate depending on each source driver IC, which is likely to cause deterioration in the display quality.

Thus, in a proposed liquid crystal display device, an output timing of the drive signal of each source driver IC is caused to match the timing of a horizontal synchronization signal (for example, see Patent Document 1: Japanese Patent Application Laid-Open No. 2014-142487).

However, even in the case of adopting the configuration described in Patent Document 1, a deviation may still occur in the output timing of the drive signal among each source driver IC due to the following phenomena, for example. That is, among the plurality of source driver ICs, differences occur in the speed of voltage rise or fall of the drive signal or the start timing of voltage rise or fall due to a skew occurring in clock signals, variations in amplifier characteristics in manufacturing, or load fluctuations on the display panel side.

As a result, color unevenness may occur between regions for which each source driver IC is responsible in an image displayed on the display panel according to the drive signal.

SUMMARY

A semiconductor device according to an embodiment of the disclosure includes a gradation voltage generation circuit, a plurality of output amplifier circuits, a drive control circuit, and a delay time measurement circuit. The gradation voltage generation circuit converts, according to a load signal, a plurality of pixel data pieces indicating a luminance of each pixel based on a video signal respectively into a plurality of gradation voltages having analog voltage values, and outputs the plurality of gradation voltages. The plurality of output amplifier circuits generate a plurality of drive signals by respectively and individually receiving and amplifying the plurality of gradation voltages outputted from the gradation voltage generation circuit, and output the plurality of drive signals to a plurality of data lines formed on a display panel. The drive control circuit receives the video signal and outputs the load signal to the gradation voltage generation circuit according to a horizontal synchronization signal included in the video signal. In a case of receiving a measurement start signal, the delay time measurement circuit obtains, as a measured delay time, a time from a time point of receiving the measurement start signal to a time point at which a voltage value of the drive signal outputted from one output amplifier circuit among the plurality of output amplifier circuits exceeds a predetermined threshold voltage. The drive control circuit supplies the load signal to the gradation voltage generation circuit according to the measurement start signal, and thereafter shifts a timing of outputting the load signal by a time difference between the measured delay time and a reference delay time.

A display driver according to an embodiment of the disclosure includes a plurality of source driver ICs and drives, by the plurality of source driver ICs, a plurality of data lines formed on a display panel. Each of the plurality of source driver ICs includes a gradation voltage generation circuit, a plurality of output amplifier circuits, a drive control circuit, and a delay time measurement circuit. The gradation voltage generation circuit converts, according to a load signal, a plurality of pixel data pieces indicating a luminance of each pixel based on a video signal respectively into a plurality of gradation voltages having analog voltage values, and outputs the plurality of gradation voltages. The plurality of output amplifier circuits generate a plurality of drive signals by respectively and individually receiving and amplifying the plurality of gradation voltages outputted from the gradation voltage generation circuit, and output the plurality of drive signals to the plurality of data lines formed on the display panel. The drive control circuit receives the video signal and outputs the load signal to the gradation voltage generation circuit according to a horizontal synchronization signal included in the video signal. In a case of receiving a measurement start signal, the delay time measurement circuit obtains, as a measured delay time, a time from a time point of receiving the measurement start signal to a time point at which a voltage value of the drive signal outputted from one output amplifier circuit among the plurality of output amplifier circuits exceeds a predetermined threshold voltage. The drive control circuit supplies the load signal to the gradation voltage generation circuit according to the measurement start signal, and thereafter shifts a timing of outputting the load signal by a time difference between the measured delay time and a reference delay time.

A display device according to an embodiment of the disclosure includes a display panel on which a plurality of data lines are formed, and a plurality of source driver ICs that drive the plurality of data lines of the display panel. Each of the plurality of source driver ICs includes a gradation voltage generation circuit, a plurality of output amplifier circuits, a drive control circuit, and a delay time measurement circuit. The gradation voltage generation circuit converts, according to a load signal, a plurality of pixel data pieces indicating a luminance of each pixel based on a video signal respectively into a plurality of gradation voltages having analog voltage values, and outputs the plurality of gradation voltages. The plurality of output amplifier circuits generate a plurality of drive signals by respectively and individually receiving and amplifying the plurality of gradation voltages outputted from the gradation voltage generation circuit, and output the plurality of drive signals to the plurality of data lines formed on the display panel. The drive control circuit receives the video signal and outputs the load signal to the gradation voltage generation circuit according to a horizontal synchronization signal included in the video signal. In a case of receiving a measurement start signal, the delay time measurement circuit obtains, as a measured delay time, a time from a time point of receiving the measurement start signal to a time point at which a voltage value of the drive signal outputted from one output amplifier circuit among the plurality of output amplifier circuits exceeds a predetermined threshold voltage. The drive control circuit supplies the load signal to the gradation voltage generation circuit according to the measurement start signal, and thereafter shifts a timing of outputting the load signal by a time difference between the measured delay time and a reference delay time.

DESCRIPTION OF EMBODIMENTS

Embodiments of the disclosure provide a semiconductor device, a display driver, and a display device capable of reducing color unevenness when driving a display panel by a plurality of source driver ICs.

In the disclosure, in a source driver IC serving as the semiconductor device, a time from the measurement start time point until the voltage value of the drive signal outputted from the output amplifier circuit according to the load signal exceeds a predetermined threshold voltage is measured as a delay time, and the timing of supplying the load signal is shifted by a time difference between the measured delay time and a reference time.

Accordingly, it is possible to perform high image quality display with reduced color unevenness at a boundary between image regions for which each source driver IC is responsible, even if there are differences in a skew in the clock signal, amplifier characteristics, or a load fluctuation amount of the display panel among the plurality of source driver ICs when outputting the drive signals to data lines of the display panel by the plurality of source driver ICs.

Hereinafter, exemplary embodiments of the disclosure will be described with reference to the accompanying drawings.

Embodiment 1

Figure 1:
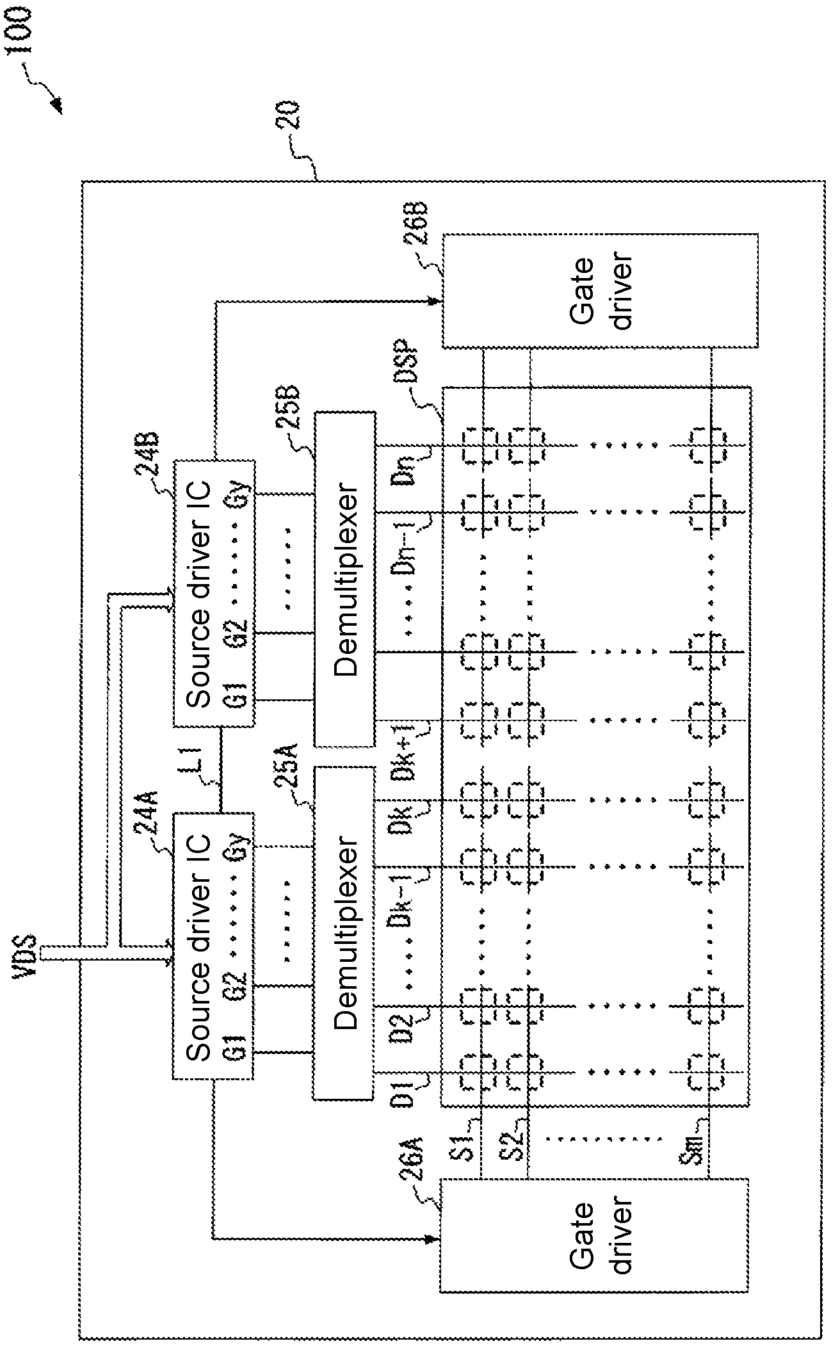
FIG. 1 is a block diagram showing a schematic configuration of a display device 100 including a display driver as a semiconductor device according to the disclosure.

FIG. 1 is a block diagram showing an example of a schematic configuration of a display device 100 including a display driver as a semiconductor device according to the disclosure.

As shown in FIG. 1, the display device 100 includes source driver ICs 24A and 24B, demultiplexers 25A and 25B, gate drivers 26A and 26B, and a display part DSP, arranged on a surface of a display panel 20.

The display part DSP includes m (m is an integer of 2 or more) scan lines S1 to Sm extending in a horizontal direction of a two-dimensional screen, and n (n is a natural number of 2 or more) data lines D1 to Dn extending in a vertical direction of the two-dimensional screen. A display cell (a region enclosed by broken lines) serving as a pixel is formed at each intersection between the scan line and the data line.

The source driver ICs 24A and 24B are respectively composed of independent semiconductor IC chips.

Among the data lines D1 to Dn of the display part DSP divided into two portions including data lines D1 to Dk (k is an integer of 2 or more) and data lines D(k+1) to Dn, the source driver IC 24A is responsible for drive of the data lines D1 to Dk. The source driver IC 24B is responsible for drive of the data lines D(k+1) to Dn. The source driver ICs 24A and 24B are connected to each other via a line L1.

The source driver IC 24A receives a video signal VDS, generates drive signals G1 to Gy (y is an integer of 2 or more) respectively corresponding to the data lines D1 to Dk of the display part DSP based on the video signal VDS, and outputs the drive signals G1 to Gy respectively as drive signals G1A to GyA to the demultiplexer 25A. The source driver IC 24B receives the video signal VDS, generates drive signals G1 to Gy respectively corresponding to the data lines D(k+1) to Dn of the display part DSP based on the video signal VDS, and outputs the drive signals G1 to Gy respectively as drive signals G1B to GyB to the demultiplexer 25B. In FIG. 1, the drive signals outputted respectively from the source driver IC 24A and the source driver IC 24B are shown as drive signals G1 to Gy.

The demultiplexer 25A receives the drive signals G1A to GyA outputted from the source driver IC 24A and supplies the drive signals G1A to GyA to y data lines among the data lines D1 to Dk. For example, in a first half period of each horizontal scan period based on the video signal VDS, the demultiplexer 25A supplies the drive signals G1A to GyA to each of odd-numbered data lines among the data lines D1 to Dk. Then, in a second half period of each horizontal scan period, the demultiplexer 25A supplies the drive signals G1A to GyA to each of even-numbered data lines among the data lines D1 to Dk.

The demultiplexer 25B receives the drive signals G1B to GyB outputted from the source driver IC 24B and supplies the drive signals G1B to GyB to y data lines among the data lines D(k+1) to Dn. For example, in the first half period of each horizontal scan period based on the video signal VDS, the demultiplexer 25B supplies the drive signals G1B to GyB to each of odd-numbered data lines among the data lines D(k+1) to Dn. Then, in the second half period of each horizontal scan period, the demultiplexer 25B supplies the drive signals G1B to GyB to each of even-numbered data lines among the data lines D(k+1) to Dn.

The gate driver 26A is connected to one end of each of the scan lines S1 to Sm of the display part DSP, and sequentially applies a horizontal scan pulse to each of the scan lines S1 to Sm according to a horizontal synchronization signal included in the video signal VDS. The gate driver 26B is connected to the other end of each of the scan lines S1 to Sm of the display part DSP, and sequentially applies a horizontal scan pulse to each of the scan lines S1 to Sm according to the horizontal synchronization signal included in the video signal VDS.

Figure 2A:
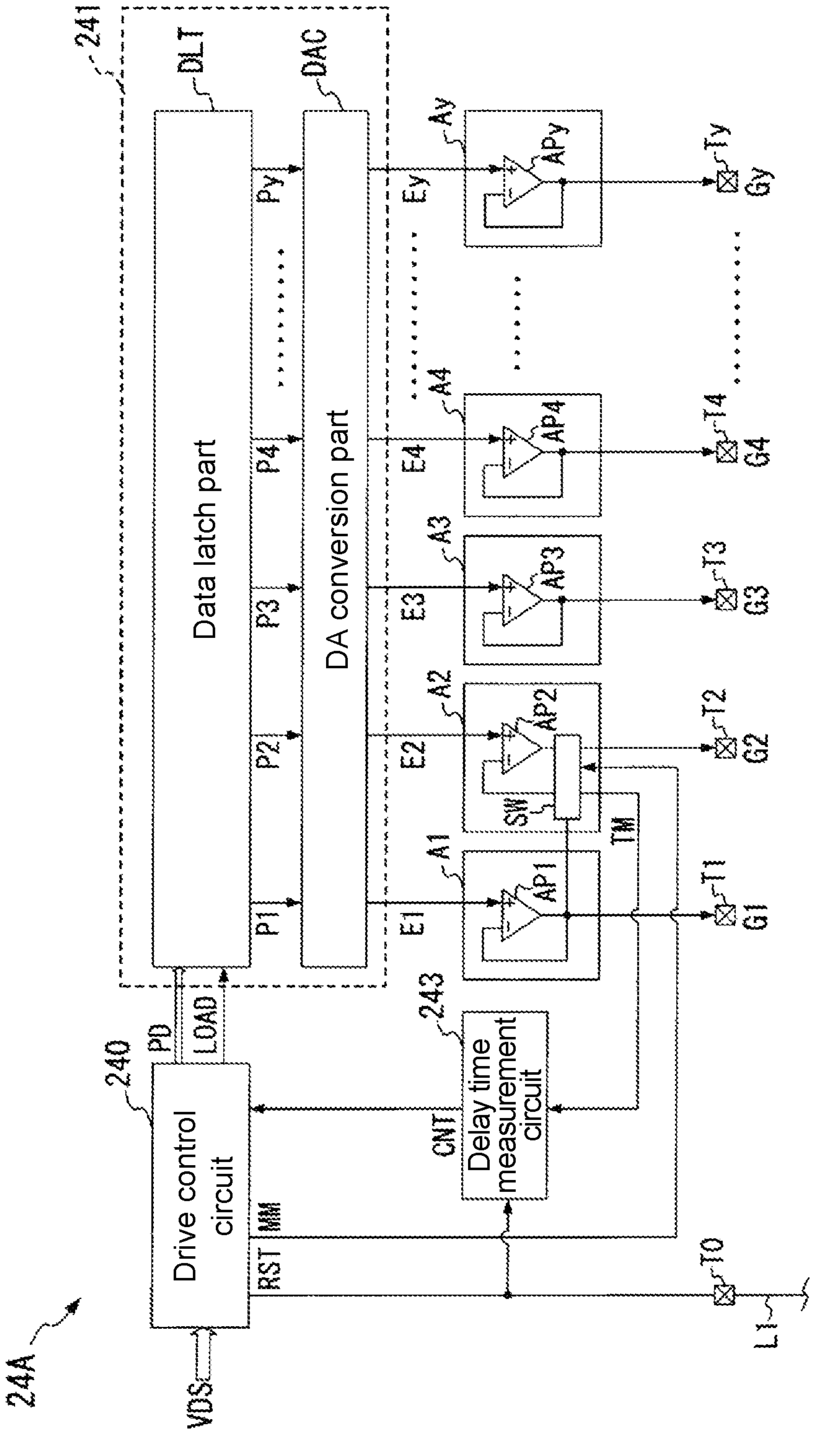
FIG. 2A is a block diagram schematically showing an example of an internal configuration of a source driver IC 24A.
Figure 2B:
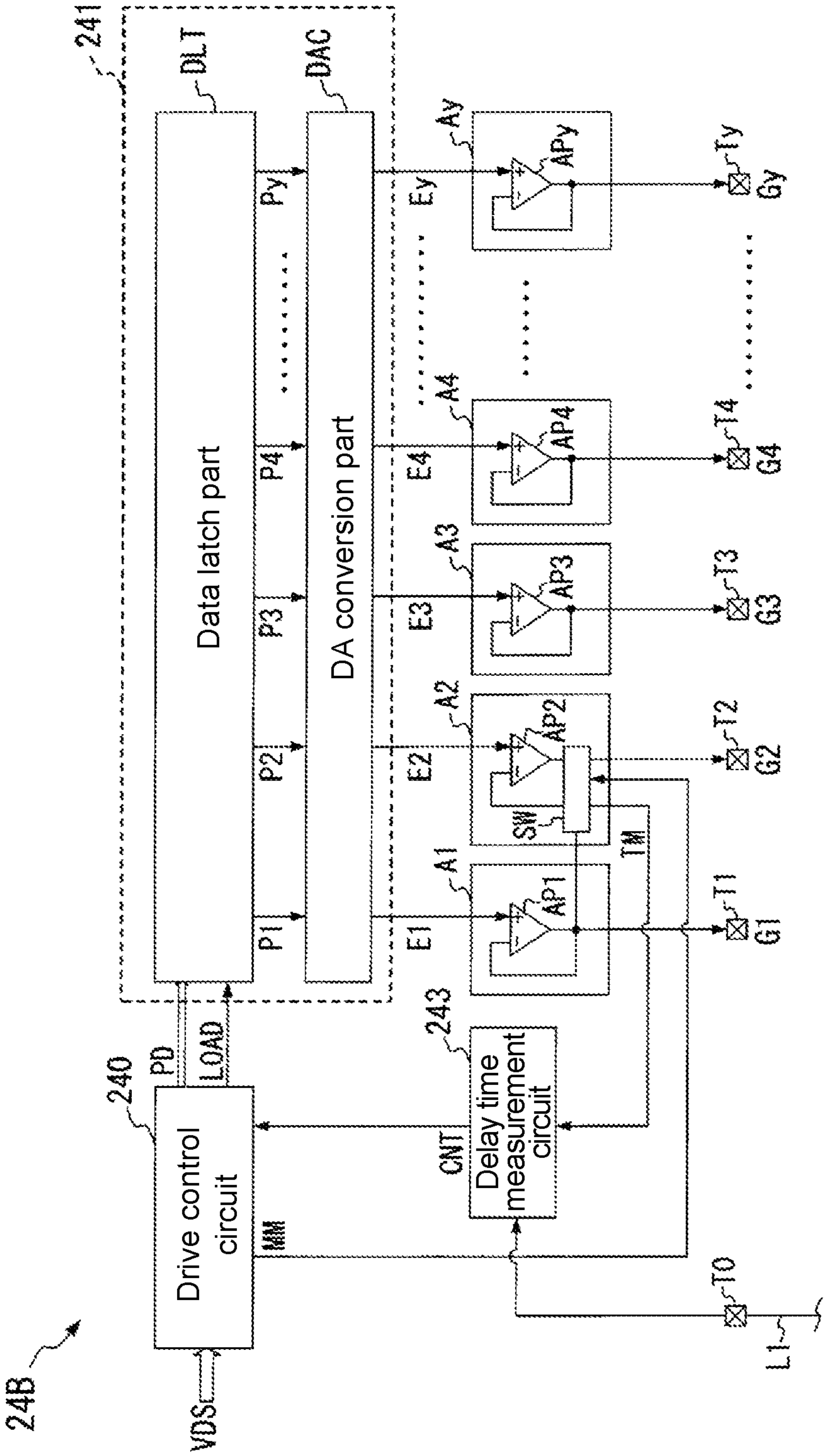
FIG. 2B is a block diagram schematically showing an example of an internal configuration of a source driver IC 24B.

FIG. 2A is a block diagram schematically showing an internal configuration of the source driver IC 24A, and FIG. 2B is a block diagram schematically showing an internal configuration of the source driver IC 24B.

The source driver ICs 24A and 24B have the same internal configuration. That is, as shown in FIG. 2A and FIG. 2B, the source driver ICs 24A and 24B each include a drive control circuit 240, a gradation voltage generation circuit 241, a delay time measurement circuit 243, and output amplifier circuits A1 to Ay.

The drive control circuit 240 receives the video signal VDS and outputs, to a data latch part DLT, a load signal LOAD indicating a timing of outputting the drive signals G1 to Gy to the data line group of the display part DSP according to the horizontal synchronization signal included in the video signal VDS. The drive control circuit 240 adjusts an output timing of the load signal LOAD based on a measured delay time CNT supplied from the delay time measurement circuit 243.

Further, in the case where a vertical synchronization signal included in the video signal VDS is detected, the drive control circuit 240 supplies an action mode signal MM to the output amplifier circuit A2.

In the case where the vertical synchronization signal is detected, the drive control circuit 240 included in the source driver IC 24A supplies a measurement start signal RST to the delay time measurement circuit 243 in a vertical blanking period, and supplies the measurement start signal RST to the source driver IC 24B via an external terminal T0 of the semiconductor IC chip and the line L1. At this time, as shown in FIG. 2B, the delay time measurement circuit 243 included in the source driver IC 24B receives the measurement start signal RST received at the external terminal T0 via the line L1.

Based on the video signal VDS, the drive control circuit 240 included in each of the source driver ICs 24A and 24B generates a video data signal PD that includes a series of pixel data pieces representing a luminance level in a digital value for each display cell serving as each pixel, and supplies the video data signal PD to the data latch part DLT.

The gradation voltage generation circuit 241 includes a data latch part DLT and a digital-to-analog (DA) conversion part DAC.

Each time the data latch part DLT captures y pixel data pieces included in the video data signal PD, the data latch part DLT outputs the y captured pixel data pieces as pixel data P1 to Py to the DA conversion part DAC at a timing of the load signal LOAD.

The DA conversion part DAC individually converts each of the pixel data P1 to Py into a gradation voltage that represents a luminance level indicated by the pixel data piece, for example, in an analog voltage value in 256 levels, and supplies the obtained y gradation voltages as gradation voltages E1 to Ey to the output amplifier circuits A1 to Ay.

The output amplifier circuits A1 to Ay include amplifiers AP1 to APy that individually receive the gradation voltages E1 to Ey, respectively. Each of the amplifiers AP1 to APy is an operational amplifier with a voltage follower configuration in which its own output terminal and inverting input terminal are connected to each other. The output amplifier circuits A1 to Ay respectively and individually receive the gradation voltages E1 to Ey at their own non-inverting input terminals, and output amplified gradation voltages E1 to Ey as drive signals G1 to Gy via external terminals T1 to Ty of the semiconductor IC chip.

Among the output amplifier circuits A1 to Ay, a specific output amplifier circuit A2 includes a switch circuit SW for measuring an output timing.

The switch circuit SW sets the output amplifier circuit A2 to one of a normal action mode and a measurement mode according to the action mode signal MM supplied from the drive control circuit 240.

For example, in the case where the action mode signal MM indicates a normal action, the switch circuit SW connects the output terminal and the inverting input terminal of the amplifier AP2 included in the output amplifier circuit A2 to form a voltage follower configuration similar to the amplifiers AP1 and AP3 to APy.

On the other hand, in the case where the action mode signal MM indicates a measurement action, the switch circuit SW connects the output terminal of the amplifier AP1 included in the output amplifier circuit A1 with the inverting input terminal of the amplifier AP2. Accordingly, the amplifier AP2 functions as a comparator that receives the drive signal G1 outputted from the amplifier AP1 at its own inverting input terminal and receives the gradation voltage E2 at its own non-inverting input terminal. At this time, the amplifier AP2 sets the gradation voltage E2 as a threshold voltage Vth, and outputs, from the output terminal as an output timing signal TM, a binary signal having a rising or falling edge at which the logic level transitions from 0 to 1 or from 1 to 0 when the voltage value of the drive signal G1 exceeds the threshold voltage Vth. The amplifier AP2 supplies the output timing signal TM to the delay time measurement circuit 243.

In the case of receiving the measurement start signal RST, the delay time measurement circuit 243 measures, as a measured delay time CNT, a time from a time point of receiving the measurement start signal RST until a time point of the rising or falling edge of the output timing signal TM, that is, measuring a time until a time point at which the voltage value of the drive signal G1 exceeds the threshold voltage Vth. Then, the delay time measurement circuit 243 supplies the measured delay time CNT to the drive control circuit 240.

Figure 3:
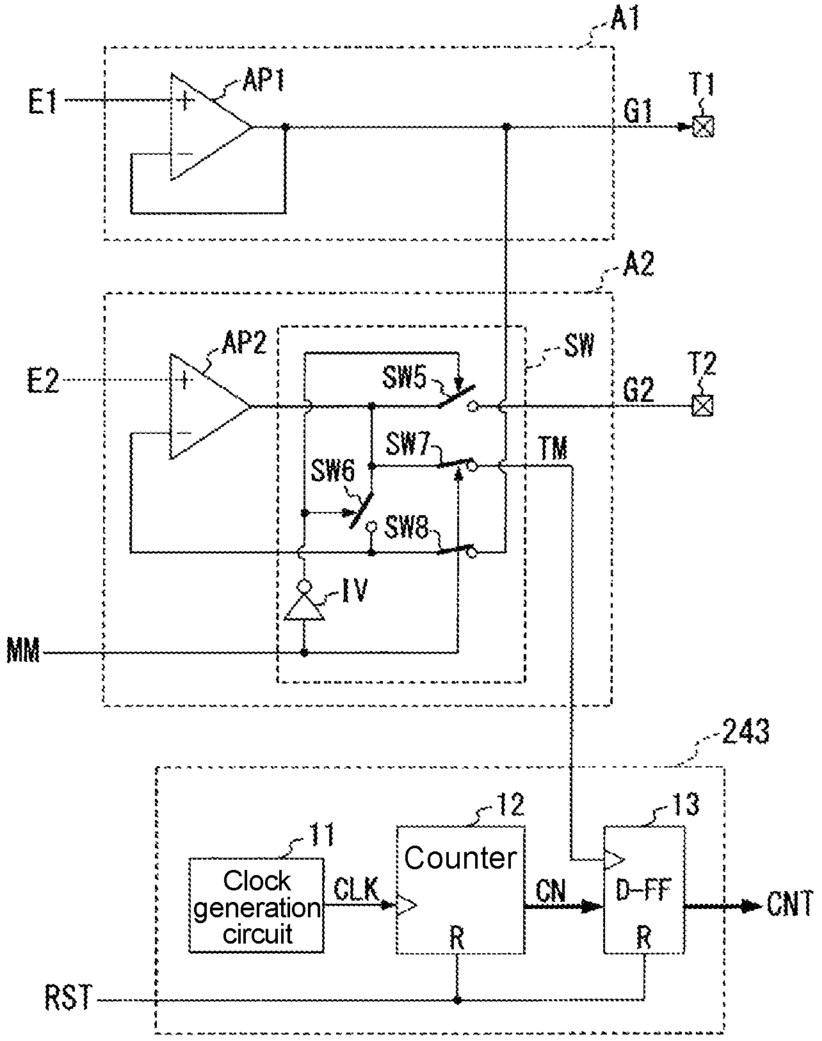
FIG. 3 is a circuit diagram showing internal configurations of each of a delay time measurement circuit 243 and output amplifier circuits A1 and A2.

FIG. 3 is a circuit diagram showing internal configurations of each of the delay time measurement circuit 243 and the output amplifier circuits A1 and A2 described above.

As shown in FIG. 3, the output amplifier circuit A1 includes an amplifier AP1 which is an operational amplifier having a voltage follower configuration with its own output terminal and inverting input terminal connected to each other. The amplifier AP1 outputs, from the external terminal T1, a drive signal G1 obtained by amplifying the gradation voltage E1 received at its own non-inverting input terminal, and supplies the drive signal G1 to the output amplifier circuit A2.

The output amplifier circuit A2 includes an amplifier AP2 as an operational amplifier that receives the gradation voltage E2 at its own non-inverting input terminal, and a switch circuit SW.

An inverter IV receives the action mode signal MM which is logic level 0 in the case of specifying the normal action and is logic level 1 in the case of specifying the measurement action, and supplies, to switch elements S5 and S6, an inverted action mode signal with the logic level of the action mode signal MM inverted.

Herein, in the case where the inverted action mode signal indicates logic level 0, that is, in the case where the measurement action is specified, the switch elements S5 and S6 both turn off. On the other hand, in the case where the inverted action mode signal indicates logic level 1, that is, in the case where the normal action is specified, the switch elements S5 and S6 both turn on. Accordingly, the amplifier AP2 serving as an operational amplifier functions as a voltage follower that outputs, as a drive signal G2, a signal obtained by amplifying the gradation voltage E2.

Switch elements S7 and S8 receive the action mode signal MM and both turn off in the case where the action mode signal MM is logic level 0 indicating the normal action. On the other hand, in the case where the action mode signal MM is logic level 1 indicating the measurement action, the switch elements S7 and S8 both turn on. Accordingly, the drive signal G1 outputted from the amplifier AP1 is supplied to the inverting input terminal of the amplifier AP2, the gradation voltage E2 is received at the non-inverting input terminal, and the amplifier AP2 functions as a comparator that compares magnitudes of the drive signal G1 and the gradation voltage E2. At this time, the amplifier AP2 sets the voltage value of the gradation voltage E2 as the threshold voltage Vth, and maintains the state of logic level 0 (or logic level 1) in the case where the voltage value of the drive signal G1 is equal to or less than the threshold voltage Vth. Then, when the voltage value of the drive signal G1 exceeds the threshold voltage Vth, the amplifier AP2 supplied, to the delay time measurement circuit 243 as the output timing signal TM, a signal having a rising (or falling) edge transitioning from logic level 0 (or logic level 1) to logic level 1 (or logic level 0).

The delay time measurement circuit 243 includes a clock generation circuit 11, a counter 12, and a D flip-flop (hereinafter referred to as a D-FF) 13.

The clock generation circuit 11 generates a high-frequency binary oscillation signal as a clock signal CLK and supplies the signal to a clock terminal of the counter 12.

Each time the counter 12 receives the measurement start signal RST, the counter 12 resets its own count value to zero, counts the number of pulses of the clock signal CLK from then on, and supplies this number as a count value CN to the D-FF 13.

Each time the D-FF 13 receives the measurement start signal RST, the D-FF 13 resets its own held value to zero, captures the count value CN of the counter 12 at a timing of the rising or falling edge of the output timing signal TM, and holds the count value CN. The D-FF 13 supplies the held count value CN as a measured delay time CNT to the drive control circuit 240.

Next, an output timing control on the drive signals G1 to Gy performed by the drive control circuit 240, the delay time measurement circuit 243, and the output amplifier circuits A1 and A2 shown in FIG. 2A and FIG. 2B will be described.

Figure 4:
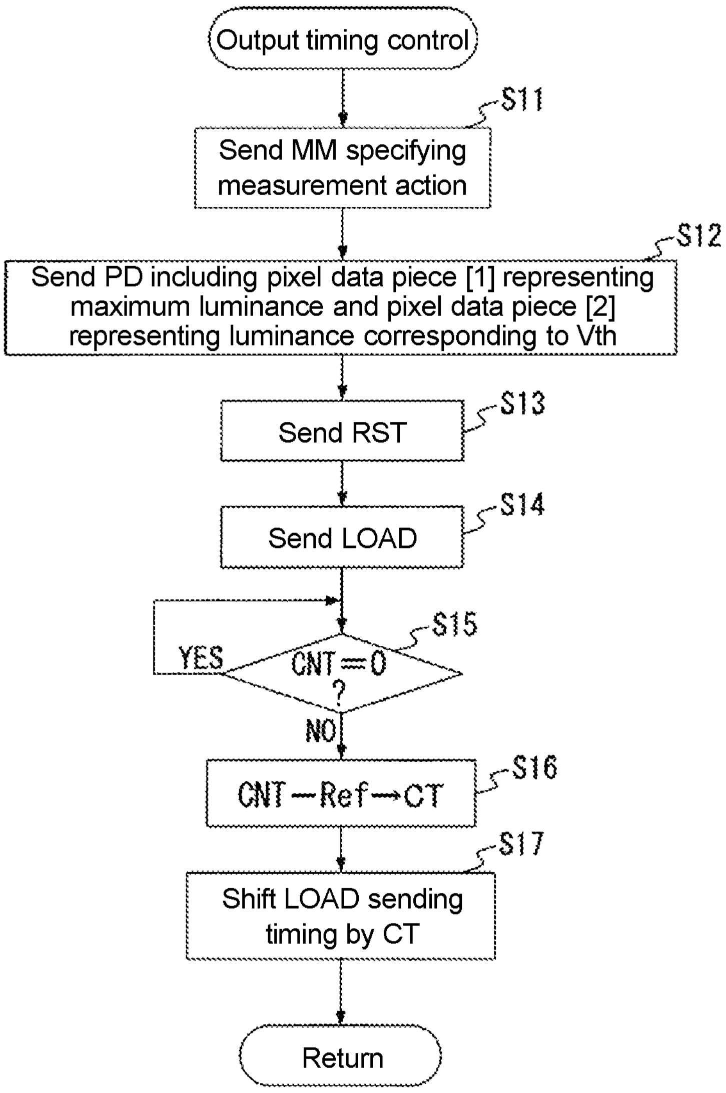
FIG. 4 is a flowchart showing a procedure of an output timing control.

First, each time a vertical synchronization signal is detected from the video signal VDS, the drive control circuit 240 executes an output timing control according to a flow shown in FIG. 4. Accordingly, the output timing control is performed in a vertical blanking period included in the video signal VDS.

In FIG. 4, the drive control circuit 240 supplies an action mode signal MM indicating the measurement action to the output amplifier circuit A2 (step S11). Accordingly, the output amplifier circuit A2 functions as a comparator that outputs, as a binary (logic level 0 or 1) output timing signal TM, a comparison result of magnitudes between the gradation voltage E2 and the drive signal G1 outputted from the output amplifier circuit A1.

Next, the drive control circuit 240 sends, to the data latch part DLT, a video data signal PD that includes, for example, a pixel data piece [1] representing a maximum luminance level and serving as the basis of the drive signal G1, and a pixel data piece [2] representing a luminance level corresponding to the threshold voltage Vth and serving as the basis of the drive signal G2 (step S12).

After execution of step S12, the drive control circuit 240 of the source driver IC 24A sends a measurement start signal RST to its own delay time measurement circuit 243, and sends the measurement start signal RST to the delay time measurement circuit 243 of the source driver IC 24B via the line L1 (step S13). The drive control circuit 240 of the source driver IC 24B does not perform sending of the above-described measurement start signal RST in step S13.

Figure 5A:
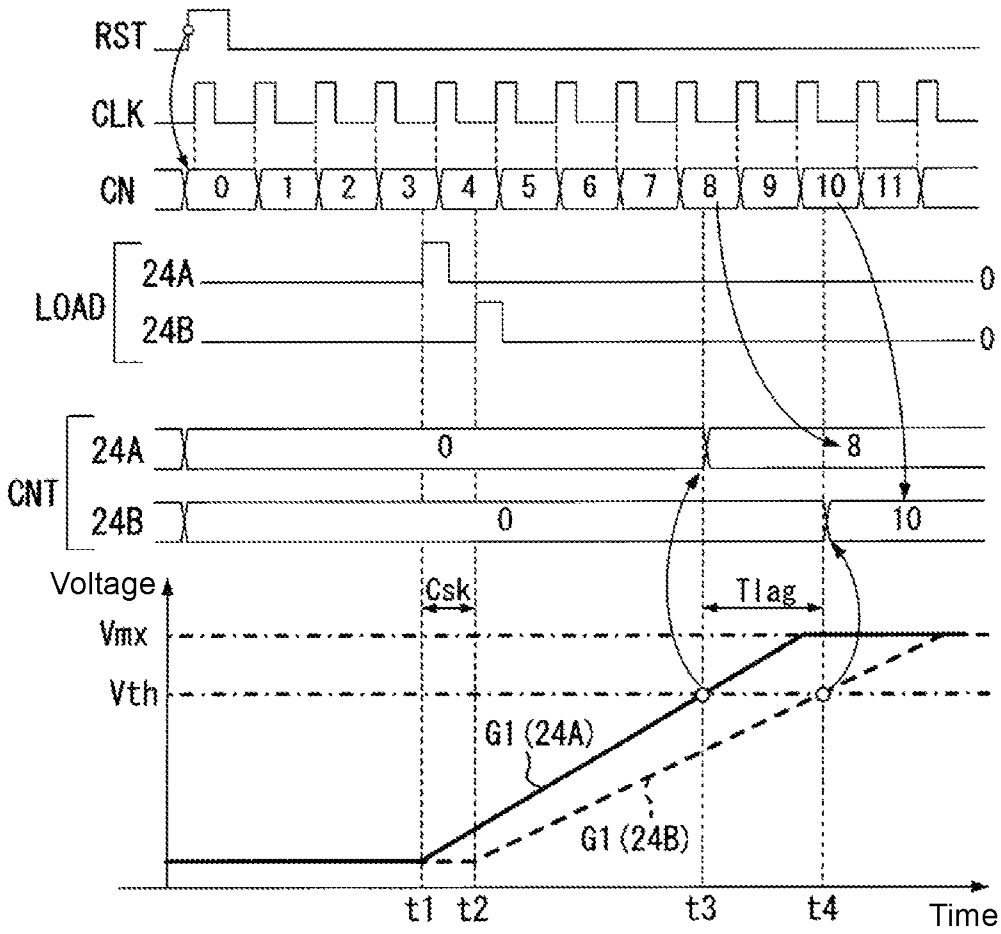
FIG. 5A is a timechart showing an example of an action at the time of output timing measurement.

Upon reception of such a measurement start signal RST, the count value CN of the counter 12 included in the delay time measurement circuit 243 of each of the source driver ICs 24A and 24B is reset to zero as shown in FIG. 5A. Then, the counter 12 counts the number of pulses of the clock signal CLK as shown in FIG. 5A and supplies the count value CN to the D-FF 13. Furthermore, upon reception of the measurement start signal RST, the measured delay time CNT held in the D-FF 13 of each of the source driver ICs 24A and 24B is also reset to zero.

After execution of step S13, the drive control circuit 240 sends a load signal LOAD to the data latch part DLT (step S14). For example, in the example shown in FIG. 5A, the drive control circuit 240 of the source driver IC 24A sends the load signal LOAD to the data latch part DLT at a time point t1 which is a timing synchronized with the clock signal included in the video signal VDS supplied to the drive control circuit 240. Similarly, the drive control circuit 240 of the source driver IC 24B also sends the load signal LOAD to the data latch part DLT at a timing synchronized with the clock signal included in the video signal VDS supplied to the drive control circuit 240. However, in the example shown in FIG. 5A, since a clock skew occurs between the clock signals included in the video signal VDS supplied to each of the source driver ICs 24A and 24B, the drive control circuit 240 of the source driver IC 24B sends the load signal LOAD to the data latch part DLT at a time point t2 that is delayed by a skew time Csk from the time point t1.

Herein, by executing step S13 described above, a gradation voltage E1 having a voltage value corresponding to the pixel data piece [1] is supplied to the amplifier AP1 of the output amplifier circuit A1 of each of the source driver ICs 24A and 24B. Furthermore, a gradation voltage E2 having a voltage value corresponding to the pixel data piece [2] is supplied to the amplifier AP2 of the output amplifier circuit A2 of each of the source driver ICs 24A and 24B.

Then, the amplifier AP1 of the source driver IC 24A starts output of a drive signal G1 corresponding to the gradation voltage E1 at the time point t1. Accordingly, as indicated by a thick solid line in FIG. 5A, the voltage value of the drive signal G1 gradually rises from the time point t1 on toward a voltage Vmx corresponding to a luminance level represented by the pixel data piece [1].

On the other hand, the amplifier AP1 of the source driver IC 24B starts output of the drive signal G1 corresponding to the gradation voltage E1 at the time point t2. Accordingly, as indicated by a thick broken line in FIG. 5A, the voltage value of the drive signal G1 gradually rises from the time point t2 on toward the voltage Vmx described above.

During this time, the output amplifier circuit A2 of each of the source driver ICs 24A and 24B functions as a comparator that compares magnitudes of the drive signal G1 and the threshold voltage Vth (=gradation voltage E2). In other words, the output amplifier circuit A2 maintains the state of logic level 0, for example, in the case where the voltage value of the drive signal G1 is equal to or less than the threshold voltage Vth, and outputs, as an output timing signal TM, a signal transitioning from logic level 0 to logic level 1 when the voltage value of the drive signal G1 becomes higher than the threshold voltage Vth.

After execution of step S14 described above, the drive control circuit 240 repeatedly determines whether the measured delay time CNT outputted from the D-FF 13 is zero (step S15), until determining that the measured delay time CNT is not zero.

During this time, the D-FF 13 of the delay time measurement circuit 243 maintains a reset state in response to the measurement start signal RST, that is, maintaining an output state of the measured delay time CNT representing zero as shown in FIG. 5A. However, thereafter, at a timing of a rising or falling edge at which the logic level of the output timing signal TM changes, that is, at a timing at which the voltage value of the drive signal G1 exceeds the threshold voltage Vth, the D-FF 13 captures the count value CN of the counter 12. Accordingly, the delay time measurement circuit 243 obtains, as a measured delay time CNT, a time from a time point of receiving the measurement start signal RST to a time point at which the voltage value of the drive signal G1 exceeds the threshold voltage Vth.

For example, as indicated by a thick solid line in FIG. 5A, the voltage value of the drive signal G1 outputted from the amplifier AP1 of the source driver IC 24A exceeds the threshold voltage Vth at a time point t3. At this time, as shown in FIG. 5A, the D-FF 13 of the source driver IC 24A captures "8", which is the count value CN at the time point t3, and outputs a measured delay time CNT indicating the "8".

In contrast, as indicated by a thick broken line in FIG. 5A, the voltage value of the drive signal G1 outputted from the amplifier AP1 of the source driver IC 24B exceeds the threshold voltage Vth at a time point t4, which is later than the time point t3. At this time, as shown in FIG. 5A, the D-FF 13 of the source driver IC 24B captures "10", which is the count value CN at the time point t4, and outputs a measured delay time CNT indicating the "10". As shown in FIG. 5A, a time difference Tlag between the time point t3, at which the drive signal G1 outputted from the source driver IC 24A reaches the threshold voltage Vth, and the time point t4, at which the drive signal G1 outputted from the source driver IC 24B reaches the threshold voltage Vth, includes variations in amplifier characteristics and load fluctuations at the display part DSP in addition to the skew time Csk. Thus, as shown in FIG. 5A, the time difference Tlag may be longer than the skew time Csk described above.

Herein, when determining that the measured delay time CNT is not zero (step S15), the drive control circuit 240 subsequently calculates a result of subtracting a predetermined reference delay time Ref from the measured delay time CNT as a time difference CT corresponding to the time difference Tlag (step S16).

Then, the drive control circuit 240 changes its own settings such that the timing of outputting the load signal LOAD to the data latch part DLT becomes an output timing time-shifted by an amount of the time difference CT from a next time on.

For example, in the case where the reference delay time Ref is set to "8", in the source driver IC 24A, since the measured delay time CNT and the reference delay time Ref are both "8", the time difference CT becomes zero. Thus, the drive control circuit 240 of the source driver IC 24A supplies the load signal LOAD to the data latch part DLT also at a timing of the time point t1 with respect to the measurement start signal RST from a next time on, as shown in FIG. 5B.

On the other hand, as shown in FIG. 5A, in the source driver IC 24B, since the measured delay time CNT is "10", the time difference CT is "2". Thus, as shown in FIG. 5B, from a next time on, the drive control circuit 240 of the source driver IC 24B supplies the load signal LOAD to the data latch part DLT at a time point to, which is shifted by a time amount of the count value "2" indicated by the time difference CT from the time point t2, which is the output timing of the load signal LOAD of the previous time.

Figure 5B:
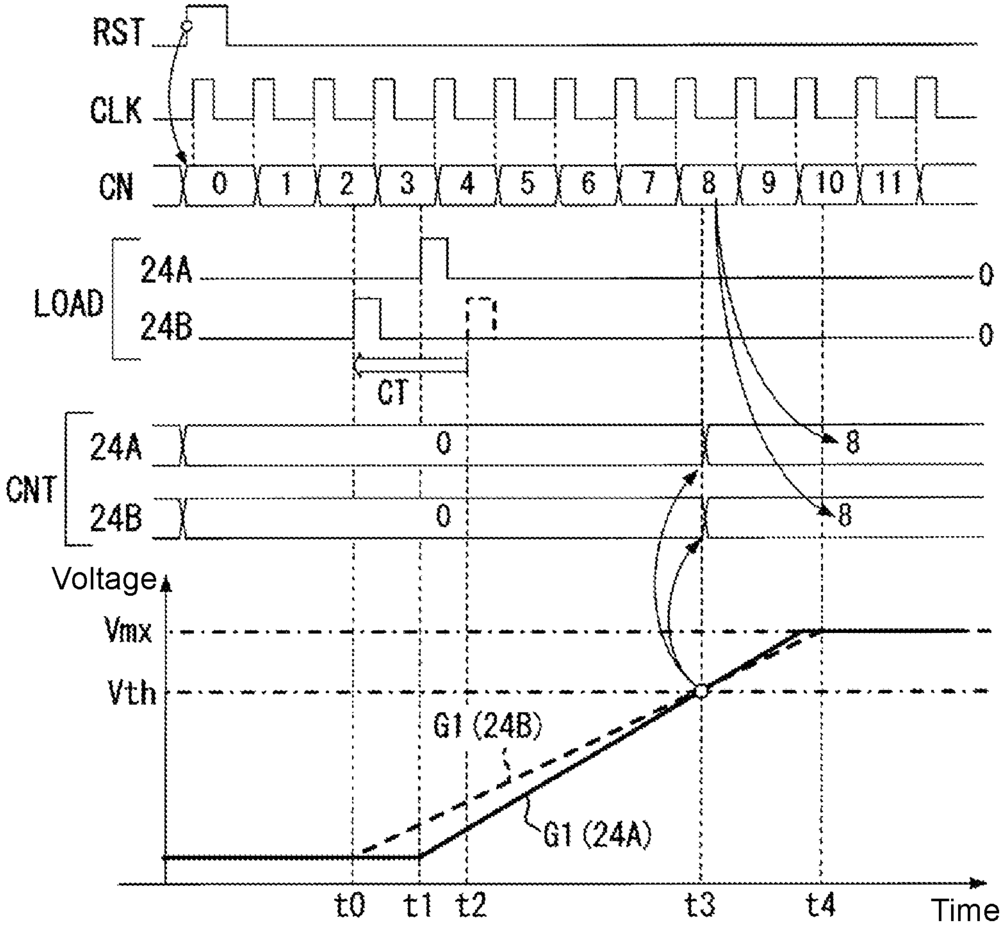
FIG. 5B is a timechart showing an example of an action after output timing correction.

Accordingly, as shown in FIG. 5B, the drive signals G1 to Gy outputted from each of the source driver ICs 24A and 24B all have voltage values that reach the threshold voltage Vth at the time point t3.

Thus, according to the above configuration, even if differences occur in a skew of the clock signal, amplifier characteristics, or a load fluctuation amount of the display part DSP between the source driver ICs 24A and 24B, it is possible to perform high image quality display with reduced color unevenness at a boundary between image regions for which the source driver ICs 24A and 24B are respectively responsible.

Embodiment 2

Figure 6A:
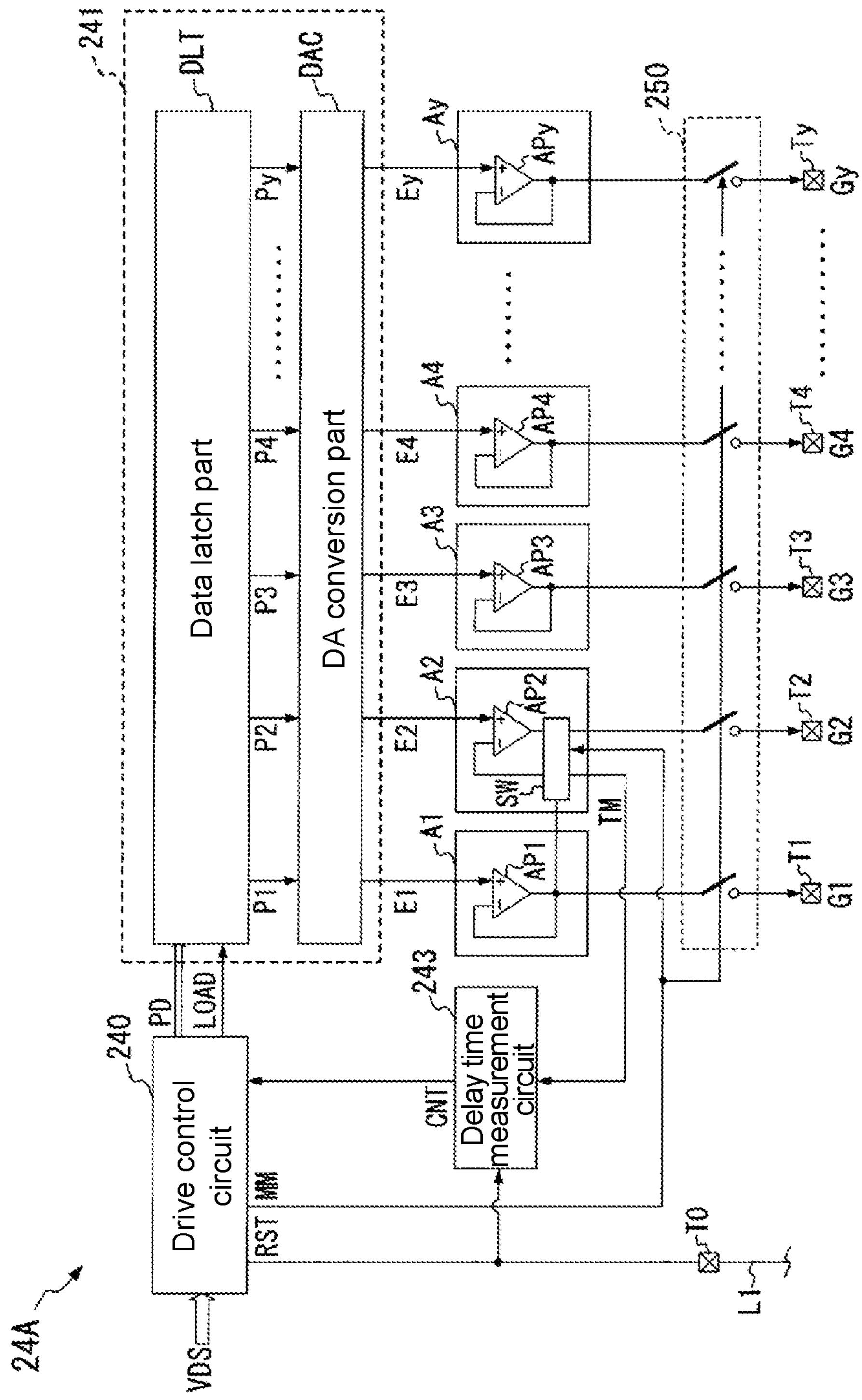
FIG. 6A is a block diagram schematically showing another example of the internal configuration of the source driver IC 24A.
Figure 6B:
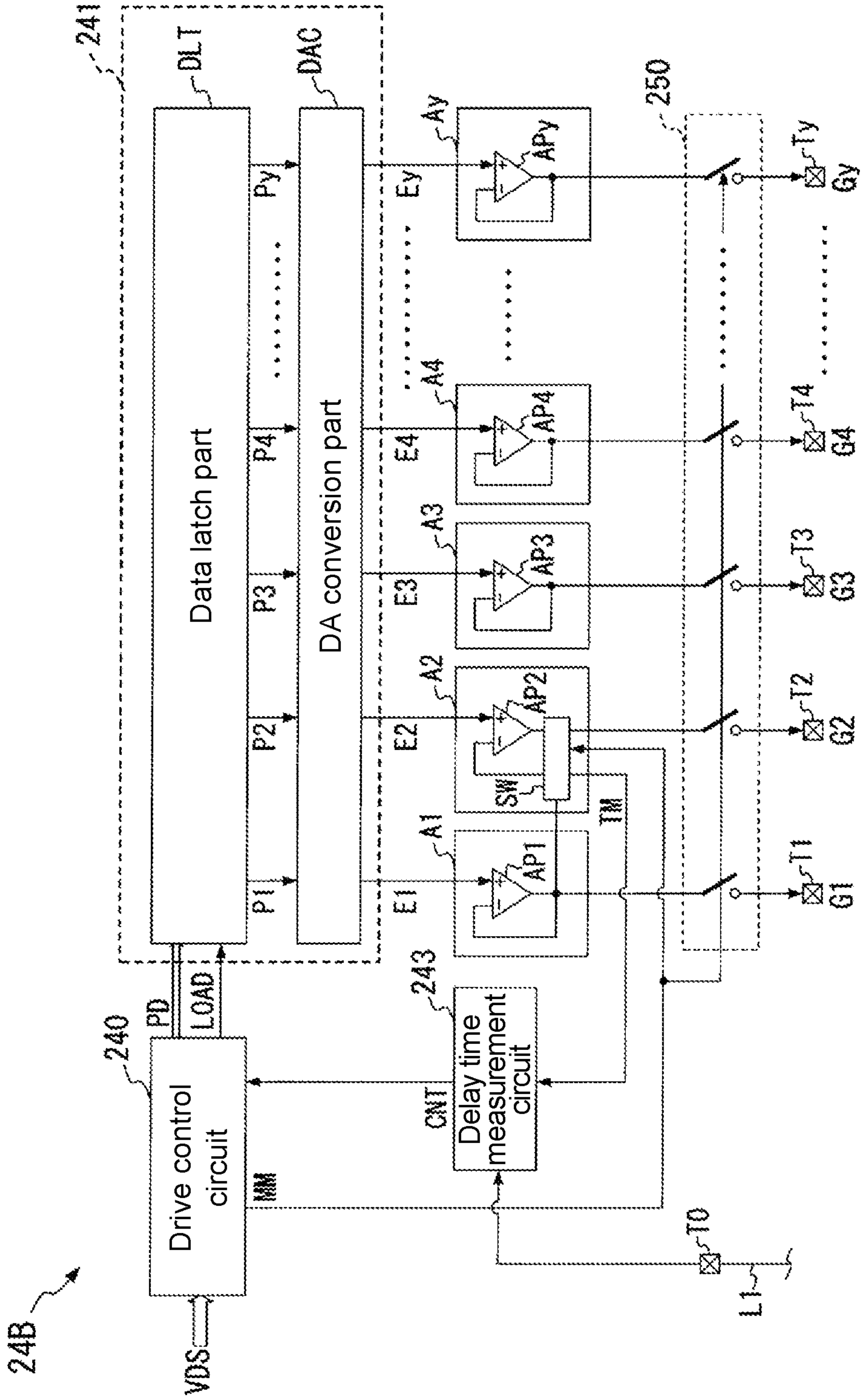
FIG. 6B is a block diagram schematically showing another example of the internal configuration of the source driver IC 24B.

FIG. 6A is a block diagram schematically showing another example of the internal configuration of the source driver IC 24A, and FIG. 6B is a block diagram schematically showing another example of the internal configuration of the source driver IC 24B.

Configurations in FIG. 6A and FIG. 6B are identical to those respectively shown in FIG. 2A and FIG. 2B, except that, herein, an output switch circuit 250 is provided between the output amplifier circuits A1 to Ay and the external terminals T1 to Ty to be capable of disconnecting the connection between the two.

The output switch circuit 250 includes y switches that are individually provided between the output amplifier circuits A1 to Ay and the external terminals T1 to Ty, all turn on in the case where the action mode signal MM indicates the normal action, and turn off in the case where the action mode signal MM indicates the measurement action. In this manner, during the measurement action, by disconnecting the connection between the source driver ICs 24A and 24B and the display part DSP, the drive signal G1 outputted from each of the source driver ICs 24A and 24B becomes unaffected by the load of the display part DSP. Accordingly, a rise waveform of the voltage value of the drive signal G1 becomes steep, and it becomes possible to reliably determine whether the voltage value of the drive signal G1 exceeds the threshold voltage Vth.

In Embodiments 1 and 2 described above, in each of the source driver ICs 24A and 24B, a time difference CT for correcting the output timing is calculated based on the difference between the measured delay time CNT and the predetermined reference delay time Ref. However, the measured delay time CNT itself measured by the source driver IC 24A may also be set as the reference delay time Ref without providing the predetermined reference delay time Ref. That is, in place of step S17 shown in FIG. 4, the source driver IC 24A executes a step of transmitting, to the source driver IC 24B, a measured delay time CNT measured by itself as the reference delay time Ref. Herein, the drive control circuit 240 included in the source driver IC 24B captures the reference delay time Ref transmitted from the source driver IC 24A. At this time, after execution of steps S11 to S15 shown in FIG. 4, the source driver IC 24B executes steps S16 and S17 shown in FIG. 4 using the reference delay time Ref sent from the source driver IC 24A. Accordingly, on the source driver IC 24B side, the output timing of the load signal LOAD to be outputted by itself is set based on this reference delay time Ref.

Further, to measure the output timing, Embodiments 1 and 2 described above adopt a configuration in which the switch circuit SW is provided in the output amplifier circuit A2, and the drive signal G1 outputted from the output amplifier circuit A1 is supplied to the output amplifier circuit A2. That is, in Embodiments 1 and 2, a function of measuring the output timing is added to a pair of output amplifier circuits A1 and A2 among the output amplifier circuits A1 to Ay.

However, such a function of measuring the output timing may also be added to another pair of output amplifier circuits other than the output amplifier circuits A1 and A2.

Embodiment 3

Figure 7A:
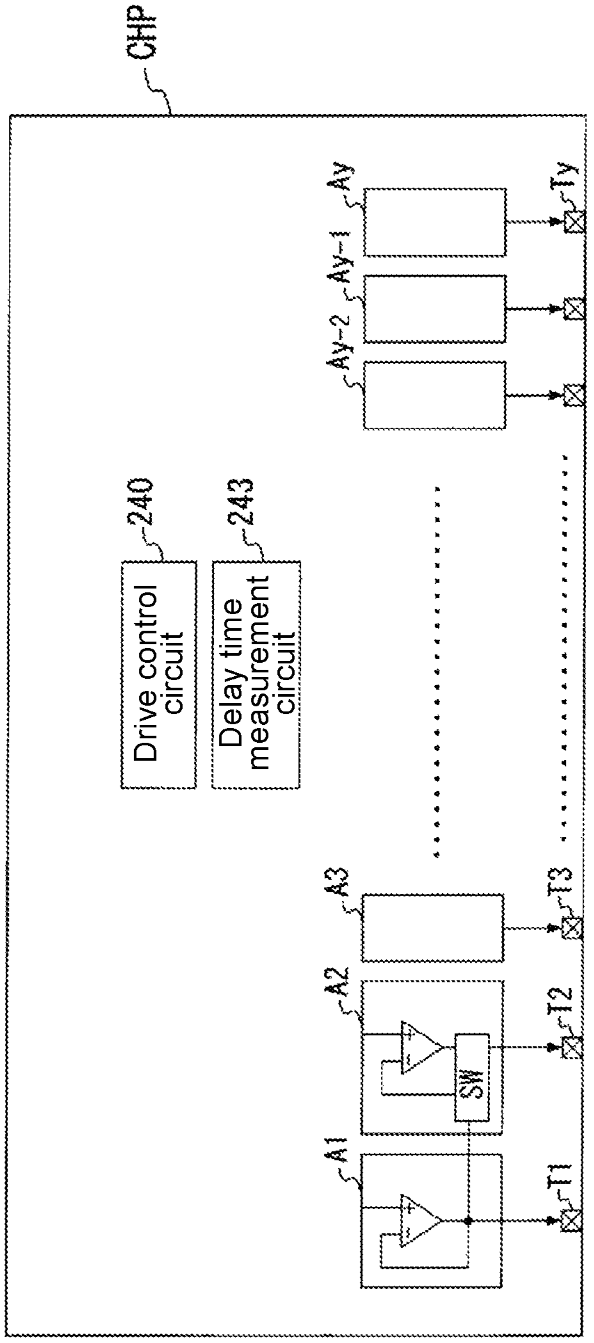
FIG. 7A is a diagram showing an example of arrangements of each of the drive control circuit 240, the delay time measurement circuit 243, and the output amplifier circuits A1 to Ay in a semiconductor IC chip CHP.

FIG. 7A is a view showing an example of arrangements of each of the drive control circuit 240, the delay time measurement circuit 243, and the output amplifier circuits A1 to Ay, formed on a surface of a semiconductor IC chip CHP serving as the source driver IC 24A (24B).

In FIG. 7A, the drive control circuit 240 and the delay time measurement circuit 243 are arranged in a central region of the surface of the semiconductor IC chip CHP having a rectangular planar shape. Further, the output amplifier circuits A1 to Ay are arranged side by side along one long side among four sides of the surface of the semiconductor IC chip CHP.

Herein, among the output amplifier circuits A1 to Ay, the output amplifier circuits A1 and A2 with an added function of measuring the output timing as shown in FIG. 2A, FIG. 2B, FIG. 6A, and FIG. 6B are arranged nearest to one short side among the four sides of the surface of the semiconductor IC chip CHP.

By adopting the arrangement shown in FIG. 7A, the difference in the output timing between the source driver ICs 24A and 24B is reduced. Thus, it is possible to further reduce color unevenness visually perceived at the boundary between an image region of the display part DSP driven by the source driver IC 24A and an image region of the display part DSP driven by the source driver IC 24B.

Figure 7B:
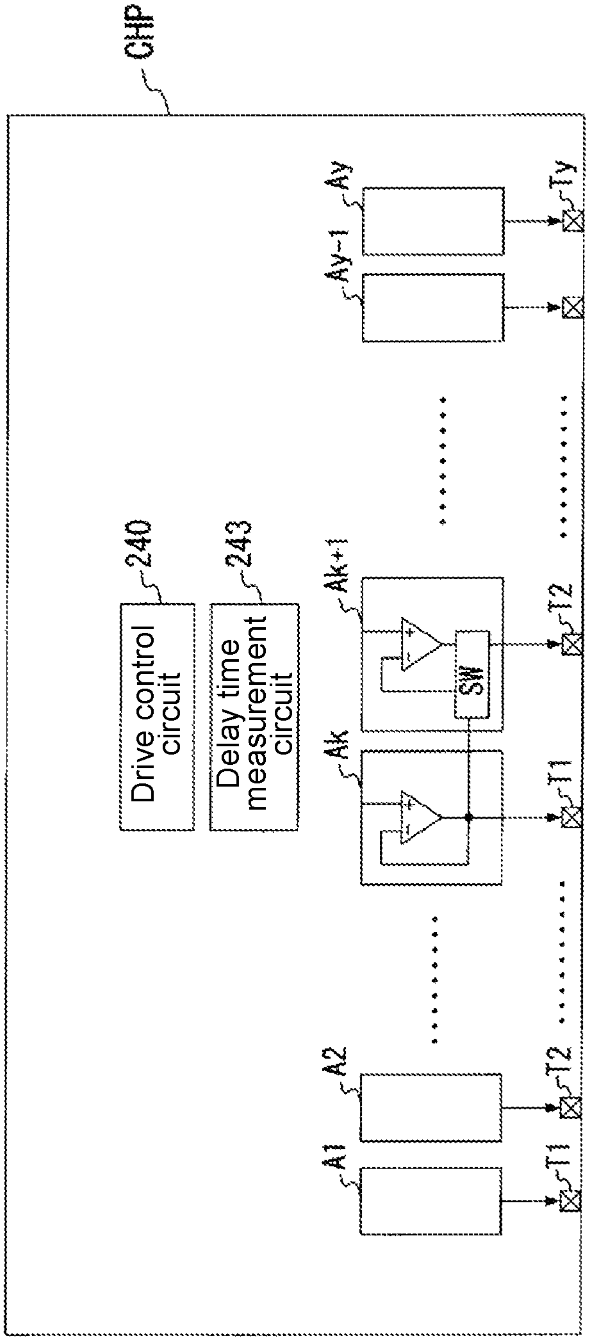
FIG. 7B is a diagram showing another example of arrangement of each of the drive control circuit 240, the delay time measurement circuit 243, and the output amplifier circuits A1 to Ay in the semiconductor IC chip CHP.

FIG. 7B is a view showing another example of arrangements of each of the drive control circuit 240, the delay time measurement circuit 243, and the output amplifier circuits A1 to Ay, formed on the surface of the semiconductor IC chip CHP.

Similar to FIG. 7A, in FIG. 7B, the drive control circuit 240 and the delay time measurement circuit 243 are arranged in a central region of a surface of a semiconductor IC chip CHP having a rectangular planar shape. Further, the output amplifier circuits A1 to Ay are arranged side by side along one long side among four sides of the surface of the semiconductor IC chip CHP.

However, in FIG. 7B, a function (SW) of measuring the output timing is added to a pair of output amplifier circuits Ak (k is an integer of 2 or more) and output amplifier circuit A(k+1) arranged at a center among the output amplifier circuits A1 to Ay arranged side by side.

By adopting the arrangement shown in FIG. 7B, since a distance from the output amplifier circuits Ak and A(k+1) to the drive control circuit 240 and the delay time measurement circuit 243 is shortened, the delay amount in a chip internal wiring connecting therebetween is reduced, and it becomes possible to acquire a highly precise time difference CT.

In the display device 100 shown in the embodiments described above, the data lines D1 to Dn formed on the display panel 20 are driven by two source driver ICs (24A, 24B), but the data lines D1 to Dn may also be driven by three or more source driver ICs.

Further, in the embodiments described above, the drive control circuit 240 performs the output timing control shown in FIG. 4, FIG. 5A, and FIG. 5B in the vertical blanking period, but it is not required to perform the output timing control in all the vertical blanking periods included in the video signal VDS. For example, the drive control circuit 240 may perform the output timing control in one vertical blanking period for each plurality of frames consecutive in the video signal VDS, or may perform the output timing control only in an initial vertical blanking period immediately after power-on. Further, during a test before product shipment, the output timing control as shown in FIG. 4, FIG. 5A, and FIG. 5B may also be performed regardless of the vertical blanking period included in the video signal VDS.

In brief, each of at least two source driver ICs, which drive the data lines D1 to Dn formed on the display panel 20 and are respectively composed of independent semiconductor IC chips, may include a gradation voltage generation circuit, a plurality of output amplifier circuits, a drive control circuit, and a delay time measurement circuit described below.

According to a load signal (LOAD), the gradation voltage generation circuit (DLT, DAC, 241) converts a plurality of pixel data pieces (P1 to Py) indicating a luminance of each pixel based on a video signal (VDS) into a plurality of gradation voltages (E1 to Ey) respectively having analog voltage values, and outputs the plurality of gradation voltages (E1 to Ey).

The plurality of output amplifier circuits (A1 to Ay) generate a plurality of drive signals (G1 to Gy) by respectively and individually receiving and amplifying the plurality of gradation voltages outputted from the gradation voltage generation circuit, and output the plurality of drive signals (G1 to Gy) to the plurality of data lines formed on the display panel (20).

The drive control circuit (240) receives a video signal (VDS) and outputs a load signal (LOAD) to the gradation voltage generation circuit according to a horizontal synchronization signal included in the video signal. Further, in the case of receiving a measurement start signal (RST), the drive control circuit (240) outputs the load signal (LOAD) to the gradation voltage generation circuit.

In the case of receiving the measurement start signal (RST), the delay time measurement circuit (243) obtains, as a measured delay time (CNT), a time from a time point of receiving the measurement start signal to a time point at which a voltage value of the drive signal (e.g., G1) outputted from one output amplifier circuit (e.g., A1) among the plurality of output amplifier circuits exceeds a predetermined threshold voltage (Vth). Herein, the drive control circuit shifts the timing of outputting the load signal (LOAD) by a difference between the measured delay time (CNT) and the reference delay time (Ref).

What is claimed is:

1. A semiconductor device comprising:

a gradation voltage generation circuit that converts, according to a load signal, a plurality of pixel data pieces indicating a luminance of each pixel based on a video signal respectively into a plurality of gradation voltages having analog voltage values, and outputs the plurality of gradation voltages;

a plurality of output amplifier circuits that generate a plurality of drive signals by respectively and individually receiving and amplifying the plurality of gradation voltages outputted from the gradation voltage generation circuit, and output the plurality of drive signals to a plurality of data lines formed on a display panel;

a drive control circuit that receives the video signal and outputs the load signal to the gradation voltage generation circuit according to a horizontal synchronization signal included in the video signal; and a delay time measurement circuit that, in a case of receiving a measurement start signal, obtains, as a measured delay time, a time from a time point of receiving the measurement start signal to a time point at which a voltage value of the drive signal outputted from one output amplifier circuit among the plurality of output amplifier circuits exceeds a predetermined threshold voltage, wherein the drive control circuit supplies the load signal to the gradation voltage generation circuit according to the measurement start signal, and thereafter shifts a timing of outputting the load signal by a time difference between the measured delay time and a reference delay time.

2. The semiconductor device according to claim 1, wherein another output amplifier circuit other than the one output amplifier circuit among the plurality of output amplifier circuits comprises:

an operational amplifier that receives the gradation voltage supplied thereto at a non-inverting input terminal; and a switch circuit configured to:

receive an action mode signal specifying a normal action or a measurement action, in a case where the action mode signal indicates the normal action, connect an output terminal of the operational amplifier to an inverting input terminal of the operational amplifier to output the drive signal from the output terminal of the operational amplifier, and in a case where the action mode signal indicates the measurement action, supply the drive signal outputted from the one output amplifier circuit as a first drive signal to the inverting input terminal of the operational amplifier and supply the gradation voltage received by the another output amplifier circuit as the threshold voltage to the non-inverting input terminal of the operational amplifier, to output, as an output timing signal, a signal indicating in a binary value whether a voltage value of the first drive signal is higher than the threshold voltage from the output terminal of the operational amplifier, and the delay time measurement circuit starts counting a pulse number of a clock signal according to the measurement start signal to obtain a count value for each pulse, and acquires the count value obtained at a timing of a rising or falling edge of the output timing signal as the measured delay time.

3. The semiconductor device according to claim 2, wherein according to a vertical synchronization signal included in the video signal, in a vertical blanking period, the drive control circuit supplies the action mode signal indicating the measurement action to the switch circuit, and subsequently outputs the measurement start signal to the delay time measurement circuit and outputs the load signal to the gradation voltage generation circuit.

4. The semiconductor device according to claim 2, comprising an external terminal that receives the measurement start signal, wherein according to a vertical synchronization signal included in the video signal, in a vertical blanking period, the drive control circuit supplies the action mode signal indicating the measurement action to the switch circuit, and subsequently outputs the load signal to the gradation voltage generation circuit.

5. The semiconductor device according to claim 3, wherein the drive control circuit supplies the action mode signal indicating the measurement action to the switch circuit, and supplies, to the gradation voltage generation circuit, a first pixel data piece for generating the gradation voltage received by the one output amplifier circuit and a second pixel data piece for generating the threshold voltage as the gradation voltage received by the another output amplifier circuit.

6. The semiconductor device according to claim 2, comprising:

a plurality of external terminals for respectively outputting the plurality of drive signals to outside; and an output switch circuit that is provided individually between the plurality of output amplifier circuits and the plurality of external terminals, individually connects the plurality of output amplifier circuits and the plurality of external terminals in a case where the action mode signal indicates the normal action, and disconnects a connection between the plurality of output amplifier circuits and the plurality of external terminals in a case where the action mode signal indicates the measurement action.

7. The semiconductor device according to claim 2, comprising a semiconductor IC chip having a rectangular planar shape on which the gradation voltage generation circuit, the plurality of output amplifier circuits, the drive control circuit, and the delay time measurement circuit are formed, wherein the drive control circuit and the delay time measurement circuit are arranged in a central region of a surface of the semiconductor IC chip, and the plurality of output amplifier circuits are arranged side by side along one long side among four sides of the surface of the semiconductor IC chip, and the one output amplifier circuit and the another output amplifier circuit are arranged nearest to one short side among the four sides of the surface of the semiconductor IC chip.

8. The semiconductor device according to claim 2, comprising a semiconductor IC chip having a rectangular planar shape on which the gradation voltage generation circuit, the plurality of output amplifier circuits, the drive control circuit, and the delay time measurement circuit are formed, wherein the drive control circuit and the delay time measurement circuit are arranged in a central region of a surface of the semiconductor IC chip, and the plurality of output amplifier circuits are arranged side by side along one long side among four sides of the surface of the semiconductor IC chip, and the one output amplifier circuit and the another output amplifier circuit are arranged at a center among the plurality of output amplifier circuits arranged side by side.

9. A display driver that comprises a plurality of source driver ICs and drives, by the plurality of source driver ICs, a plurality of data lines formed on a display panel, each of the plurality of source driver ICs comprising:

a gradation voltage generation circuit that converts, according to a load signal, a plurality of pixel data pieces indicating a luminance of each pixel based on a video signal respectively into a plurality of gradation voltages having analog voltage values, and outputs the plurality of gradation voltages;

a plurality of output amplifier circuits that generate a plurality of drive signals by respectively and individually receiving and amplifying the plurality of gradation voltages outputted from the gradation voltage generation circuit, and output the plurality of drive signals to the plurality of data lines formed on the display panel;

a drive control circuit that receives the video signal and outputs the load signal to the gradation voltage generation circuit according to a horizontal synchronization signal included in the video signal; and a delay time measurement circuit that, in a case of receiving a measurement start signal, obtains, as a measured delay time, a time from a time point of receiving the measurement start signal to a time point at which a voltage value of the drive signal outputted from one output amplifier circuit among the plurality of output amplifier circuits exceeds a predetermined threshold voltage, wherein the drive control circuit supplies the load signal to the gradation voltage generation circuit according to the measurement start signal, and thereafter shifts a timing of outputting the load signal by a time difference between the measured delay time and a reference delay time.

10. The display driver according to claim 9, comprising a first line connecting between the plurality of source driver ICs, wherein the drive control circuit included in one source driver IC among the plurality of source driver ICs generates the measurement start signal according to a vertical synchronization signal included in the video signal, supplies the measurement start signal to the delay time measurement circuit included in the one source driver IC, and supplies the generated measurement start signal, via the first line, to the delay time measurement circuit included in another source driver IC other than the one source driver IC among the plurality of source driver ICs.

11. A display device comprising a display panel on which a plurality of data lines are formed, and a plurality of source driver ICs that drive the plurality of data lines of the display panel, each of the plurality of source driver ICs comprising:

a gradation voltage generation circuit that converts, according to a load signal, a plurality of pixel data pieces indicating a luminance of each pixel based on a video signal respectively into a plurality of gradation voltages having analog voltage values, and outputs the plurality of gradation voltages;

a plurality of output amplifier circuits that generate a plurality of drive signals by respectively and individually receiving and amplifying the plurality of gradation voltages outputted from the gradation voltage generation circuit, and output the plurality of drive signals to the plurality of data lines formed on the display panel;

a drive control circuit that receives the video signal and outputs the load signal to the gradation voltage generation circuit according to a horizontal synchronization signal included in the video signal; and a delay time measurement circuit that, in a case of receiving a measurement start signal, obtains, as a measured delay time, a time from a time point of receiving the measurement start signal to a time point at which a voltage value of the drive signal outputted from one output amplifier circuit among the plurality of output amplifier circuits exceeds a predetermined threshold voltage, wherein the drive control circuit supplies the load signal to the gradation voltage generation circuit according to the measurement start signal, and thereafter shifts a timing of outputting the load signal by a time difference between the measured delay time and a reference delay time.

12. The display device according to claim 11, comprising a first line connecting between the plurality of source driver ICs, wherein the drive control circuit included in one source driver IC among the plurality of source driver ICs generates the measurement start signal according to a vertical synchronization signal included in the video signal, supplies the measurement start signal to the delay time measurement circuit included in the one source driver IC, and supplies the generated measurement start signal, via the first line, to the delay time measurement circuit included in another source driver IC other than the one source driver IC among the plurality of source driver ICs.

* * * * *